(12) United States Patent
Nakamura et al.

(10) Patent No.: US 12,467,953 B2
(45) Date of Patent: Nov. 11, 2025

(54) PROBE CARD

(71) Applicant: Japan Electronic Materials Corporation, Hyogo (JP)

(72) Inventors: Yuuki Nakamura, Hyogo (JP); Masatoshi Hasaka, Hyogo (JP); Hiroshi Yamanaka, Hyogo (JP)

(73) Assignee: JAPAN ELECTRONIC MATERIALS CORPORATION, Hyogo (JP)

( * ) Notice: Subject to any disclaimer, the term of this patent is extended or adjusted under 35 U.S.C. 154(b) by 132 days.

(21) Appl. No.: 18/265,264

(22) PCT Filed: Mar. 15, 2021

(86) PCT No.: PCT/JP2021/010294
§ 371 (c)(1),
(2) Date: Jun. 5, 2023

(87) PCT Pub. No.: WO2022/195648
PCT Pub. Date: Sep. 22, 2022

(65) Prior Publication Data
US 2024/0044942 A1    Feb. 8, 2024

(51) Int. Cl.
*G01R 1/073* (2006.01)
(52) U.S. Cl.
CPC .................. *G01R 1/07342* (2013.01)
(58) Field of Classification Search
CPC .................. G01R 1/07307; G01R 1/07342
See application file for complete search history.

(56) References Cited

U.S. PATENT DOCUMENTS

| | | | | |
|---|---|---|---|---|
| 4,567,432 A | * | 1/1986 | Buol | G01R 31/2891 324/750.25 |
| 6,429,671 B1 | | 8/2002 | Duckworth et al. | |
| 6,814,889 B1 | | 11/2004 | O'Grady et al. | |
| 2010/0126289 A1 | | 5/2010 | Kinoshita | |

(Continued)

FOREIGN PATENT DOCUMENTS

| | | |
|---|---|---|
| JP | H0196944 A | 4/1989 |
| JP | H11154694 A | 6/1999 |
| JP | 2000346875 A | 12/2000 |

(Continued)

OTHER PUBLICATIONS

International Search Report and Written Opinion issued in corresponding International Patent Application No. PCT/JP2021/010294 (with English translation of International Search Report) mailed Jun. 15, 2021 (8 pages).

(Continued)

*Primary Examiner* — Tung X Nguyen
(74) *Attorney, Agent, or Firm* — Kilyk & Bowersox, P.L.L.C.

(57) ABSTRACT

An object is to provide a probe card for high-temperature inspection at low cost. A wiring board 130 that supports a large number of probes 15, a heat-generating film 3 formed on the wiring board 130, and a pair of electrode terminals 4 that supplies a current to the heat-generating film 3 are provided, and the heat-generating film 3 is formed on a surface of the wiring board 130 by applying a heat-generating coating material in which fine carbon particles are dispersed in a binder.

9 Claims, 9 Drawing Sheets

(56) References Cited

U.S. PATENT DOCUMENTS

2010/0156449 A1   6/2010  Nitta et al.
2020/0174063 A1   6/2020  Huang

FOREIGN PATENT DOCUMENTS

| JP | 2001330626 A |   | 11/2001 |
| JP | 2007184417 A |   | 7/2007 |
| JP | 2010080486 A | * | 4/2010 |
| JP | 2011117761 A |   | 6/2011 |
| JP | 2017118138 A |   | 6/2017 |
| KR | 20-0339049 Y1 |  | 1/2004 |
| WO | 2022176143 A1 |  | 8/2022 |

OTHER PUBLICATIONS

Request for the Submission of an Opinion issued in corresponding Korean Patent Application No. 10-2023-7015422 dated Oct. 11, 2024 (13 pages).

\* cited by examiner (a) FRONT VIEW (b) BOTTOM VIEW (c) PLAN VIEW (d) D-D CROSS SECTION

PROBE CARD This application is a National Stage Application of PCT/JP2021/010294, filed Mar. 15, 2021.

TECHNICAL FIELD

The present invention relates to a probe card, and more particularly to an improvement of a probe card including a wiring board that supports a large number of probes.

BACKGROUND ART

A probe card is an inspection apparatus used at the time of inspecting electrical characteristics of a semiconductor device formed on a semiconductor wafer, and a large number of probes to be brought into contact with electrode pads on the semiconductor wafer are provided on a wiring board.

The semiconductor device is inspected by bringing the semiconductor wafer close to the probe card, bringing tips of the probes into contact with the electrode pads on the semiconductor wafer, and causing a current to flow between a tester device to the semiconductor device via the probes and the wiring board. Therefore, position matching (alignment) between the probe card and the semiconductor wafer is performed before the inspection such that the tips of the probes come into contact with the electrode pads.

A high-temperature test is a test for measuring electrical characteristics by applying thermal stress to the semiconductor wafer, and the semiconductor wafer is maintained at a high temperature using a heater embedded in a stage on which the semiconductor wafer is placed. In such a high-temperature test, if a temperature difference between the probe card and the semiconductor wafer is large, heat of the semiconductor wafer is transferred to the probe card, the probe card is thermally expanded during inspection, and a relative position between the probe and the electrode pad fluctuates, which has been a problem.

In order to solve such a problem, a method in which a heater is built in a wiring board of a probe card to heat the wiring board before and during inspection, and a method (preheating) in which a probe card is arranged to oppose an external heater to be heated in advance before inspection are performed.

CITATION LIST

Patent Literature

Patent Literature 1: Japanese Patent No. 5199859

SUMMARY OF INVENTION

Technical Problem

In the case of performing heating with the built-in heater, it is necessary to add a wiring layer for the heater to the wiring board, and there is a problem that manufacturing cost increases. In addition, heat is generated by causing a current to flow through a wiring pattern having a narrow line width, and thus, there is a problem that the wiring pattern of an electric heating wire for the heater is likely to be disconnected. In particular, when a wide region is to be heated using the heater, it is necessary to form a long wiring pattern meandering in the region, and there is a problem that the disconnection is more likely to occur and the reliability of the probe card is lowered.

In addition, in the case of performing preheating by the external heater, there is a problem that the temperature of the probe decreases during alignment of the semiconductor wafer performed after the preheating. In addition, the probe card has a problem that the temperature at an outer peripheral edge portion is lower than that of a central portion, and a temperature gradient is likely to be generated on the main surface.

The present invention has been made in view of the above circumstances, and an object thereof is to provide a probe card for high-temperature inspection at low cost. In addition, another object is to improve the reliability of the probe card for high-temperature inspection. Further, still another object is to suppress generation of a temperature gradient on the main surface of the probe card for high-temperature inspection.

Solution to Problem

A probe card according to a first aspect of the present invention includes: a wiring board that supports a large number of probes; a heat-generating film formed on the wiring board; and a pair of electrode terminals that supplies a current to the heat-generating film, the heat-generating film being formed on a surface of the wiring board by applying a heat-generating coating material containing fine carbon particles and a binder.

Since such a configuration is adopted, a heat-generating film can be formed in any region on the surface of the wiring board to heat the wiring board. Therefore, the probe card can be effectively heated as compared with a conventional method in which an electric heating wire is formed to heat a wiring board.

A probe card according to a second aspect of the present invention is configured such that at least a part of the heat-generating film is formed on a side surface of the wiring board, in addition to the above configuration.

Since such a configuration is adopted, the wiring board can be heated from the side surface. Therefore, the wiring board can be heated without occupying a space on a main surface, and thus, the heating can be performed without restricting the arrangement of a circuit pattern, the probe, and the like on the main surface. In addition, the heating can be performed from the outer side on a horizontal plane that is hardly warmed in a conventional heating method, and thus, generation of a temperature gradient on the main surface of the wiring board can be suppressed.

In a probe card according to a third aspect of the present invention, one of the pair of electrode terminals is formed on one main surface of the wiring board, and the other of the pair of electrode terminals is formed on the other main surface of the wiring board, in addition to the above configuration.

Since such a configuration is adopted, heat can be generated in a portion having a wider area out of the heat-generating film, and heat can be effectively generated.

In a probe card according to a fourth aspect of the present invention, the pair of electrode terminals is formed near a pair of end sides of the heat-generating film opposing each other in a circumferential direction, in addition to the above configuration.

Since such a configuration is adopted, heat can be generated in the portion having the wider area out of the heat-generating film, and heat can be effectively generated.

In a probe card according to a fifth aspect of the present invention, the heat-generating film is formed in a region on the main surface adjacent to the side surface of the wiring board, in addition to the above configuration.

Since such a configuration is adopted, the heat-generating film can be formed in the region on the main surface adjacent to the side surface, and the wiring board can be heated by efficiently utilizing the empty space near an outer peripheral edge portion on the main surface. In addition, heating can be performed from the outer side in a horizontal plane that is hardly warmed in a conventional heating method, and thus, generation of a temperature gradient in the horizontal plane of the wiring board can be suppressed.

A probe card according to a sixth aspect of the present invention includes a heater circuit in a region on the main surface separated from the side surface of the wiring board, in addition to the above configuration.

Since such a configuration is adopted, a side closer to the inside on the main surface of the wiring board can be heated by the heater circuit, and a side closer to the outside can be heated by the heat-generating film. Therefore, the generation of the temperature gradient in the horizontal plane of the wiring board can be suppressed.

In a probe card according to a seventh aspect of the present invention, the wiring board is divided into a circuit region in which a circuit pattern is formed and a non-circuit region surrounding the circuit region in a plane parallel to a main surface, and at least a part of the heat-generating film is formed in the non-circuit region, in addition to the above configuration.

Since such a configuration is adopted, the wiring board can be heated by efficiently utilizing the non-circuit region. In addition, heating can be performed from the outer side in a horizontal plane that is hardly warmed in a conventional heating method, and thus, generation of a temperature gradient in the horizontal plane of the wiring board can be suppressed.

A probe card according to an eighth aspect of the present invention includes a heater circuit in the circuit region of the wiring board, in addition to the above configuration.

Since such a configuration is adopted, the side closer to the inside on the main surface of the wiring board can be heated by the heater circuit, and the side closer to the outside can be heated by the heat-generating film. Therefore, the generation of the temperature gradient in the horizontal plane of the wiring board can be suppressed.

In a probe card according to a ninth aspect of the present invention, the pair of electrode terminals is formed in the circuit region, in addition to the above configuration.

Since such a configuration is adopted, a current can be supplied to the heat-generating film using the circuit pattern of the circuit region.

Advantageous Effects of Invention

According to the present invention, it is possible to provide the probe card for high-temperature inspection at low cost by forming the heat-generating film on the wiring board. In addition, the reliability of the probe card for high-temperature inspection can be improved. Further, it is possible to suppress the generation of the temperature gradient on the main surface of the probe card for high-temperature inspection.

DESCRIPTION OF EMBODIMENTS

First Embodiment (1) Probe Card 10

Figure 1:
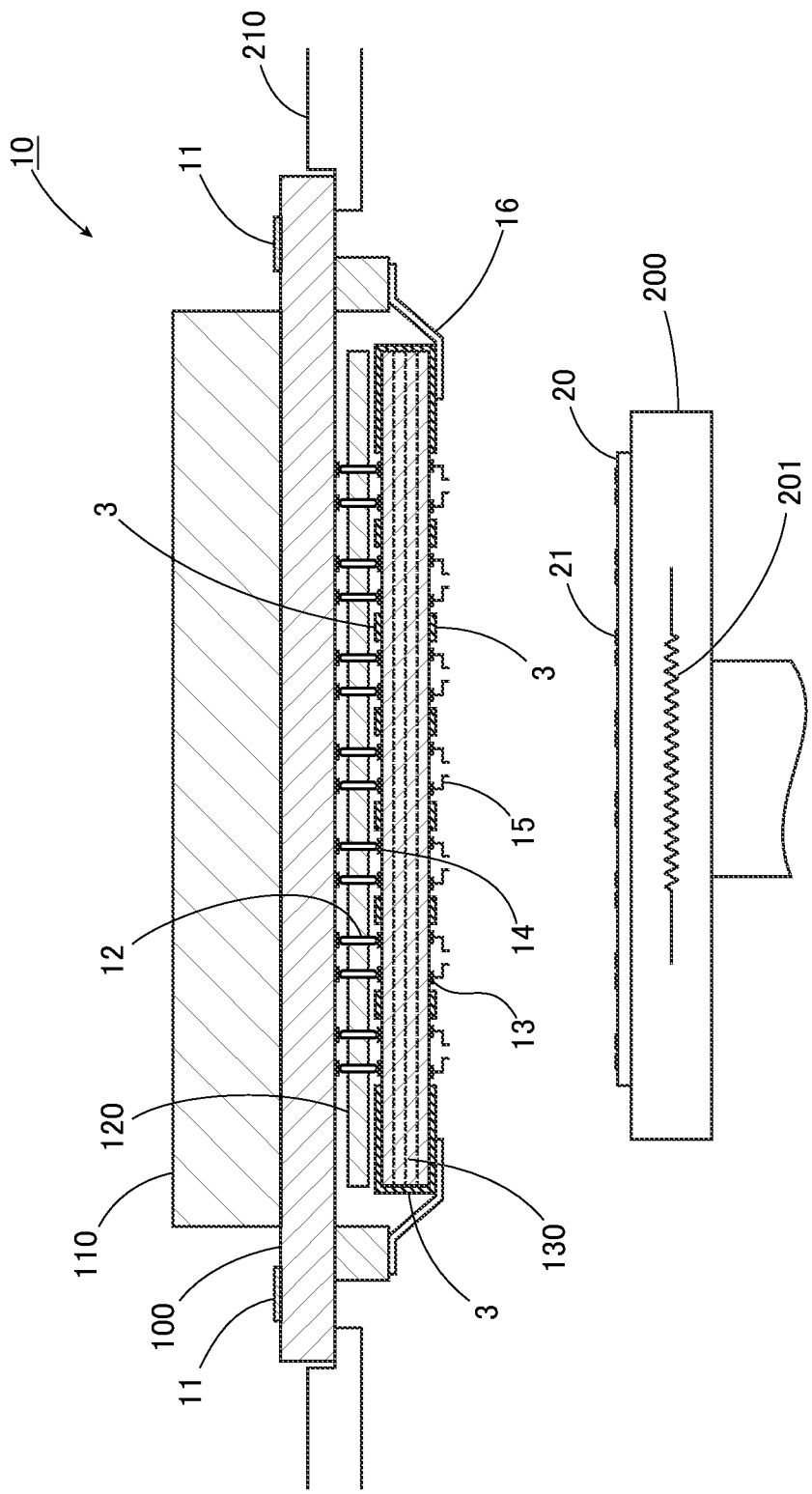
FIG. 1 is a diagram illustrating an example of a schematic configuration of a probe card 10 according to a first embodiment of the present invention.

FIG. 1 is a diagram illustrating an example of a schematic configuration of a probe card 10 according to a first embodiment of the present invention. The probe card 10 is attached to a wafer prober with a probe installation surface facing downward, opposes a semiconductor wafer 20 placed on a stage 200, and can bring probes 15 into contact with electrode pads 21 on the semiconductor wafer 20 by moving the stage 200 up and down.

The probe card 10 includes a main board 100, a reinforcing plate 110, an interposer 120, a space transformer (ST) board 130, and two or more probes 15.

The main board 100 is a wiring board detachably attached to the wafer prober, and for example, a disk-shaped glass epoxy substrate is used. The main board 100 is supported by a card holder 210 of the wafer prober at a peripheral edge portion of a lower surface and is arranged substantially horizontally. The reinforcing plate 110 configured to suppress distortion of the main board 100 is attached to a central portion of an upper surface of the main board 100. In addition, two or more external terminals 11 to which signal terminals of a tester device (not illustrated) are connected are provided on the upper surface of the main board 100.

The interposer 120 is a means for connection between boards arranged between the main board 100 and the ST board 130 and causing a current to flow between a wiring of the main board 100 and a wiring of the ST board 130, and includes, for example, a large number of pogo pins 12.

The ST board 130 is an insulating multilayer wiring board, for example, a laminate plate obtained by pasting two or more ceramic plates to each other, and is used to convert an electrode pitch. The ST board 130 is attached to the main board 100 by a board holder 16, and is arranged substantially horizontally. The board holder 16 has one end fixed to the lower surface of the main board 100 and the other end supporting a peripheral edge portion of a lower surface of the ST board 130.

Two or more probe electrodes 13 configured for attachment of the probes 15 are formed on the lower surface of the ST board 130. In addition, two or more pogo pin electrodes 14 configured for abutment of the pogo pins 12 of the interposer 120 are formed on an upper surface of the ST board 130. The probe electrode 13 is electrically connected to the pogo pin electrode 14 through a wiring pattern and a through hole in the ST board 130, and electrically connects the probe 15 and the main board 100. The probe electrode 13 and the pogo pin electrode 14 are metal films formed by photolithography processing using an electroplating method or an etching method. In addition, a heat-generating film 3 is formed on the surface of the ST board 130.

The probe 15 is made of elastically deformable conductive metal such as a nickel-cobalt alloy (NiCo), and has a tip configured for contact with the electrode pad 21.

The stage 200 is a placement table of the semiconductor wafer 20, and can move and rotate in a horizontal plane and move in a vertical direction. The heater 201 is a heater for high-temperature inspection built in the stage 200, and ca heat the semiconductor wafer 20.

(2) Heat-Generating Film 3

The heat-generating film 3 is a film that has a composition in which fine carbon particles are mixed with a binder and generates heat by energization. The heat-generating film 3 is formed on the surface of the ST board 130 by applying a heat-generating coating material. The temperature of the ST board 130 at the time of high-temperature inspection can be maintained at a predetermined inspection temperature by energizing the heat-generating film 3 before or during the inspection.

The heat-generating film 3 can be formed on the lower surface, the upper surface, or a side surface of the ST board 130. In addition, the heat-generating film 3 is formed in a region where the probe electrodes 13 and the pogo pin electrodes 14 are not formed. For example, when being formed on the lower surface of the ST board 130, the heat-generating film 3 is formed in the peripheral edge portion of the ST board 130 where the probe electrodes 13 are not formed or between the probe electrodes 13 adjacent to each other. When being formed on the upper surface of the ST board, the heat-generating film 3 is formed in a peripheral edge portion of the ST board 130 where the pogo pin electrodes 14 are not formed or between the pogo pin electrodes 14 adjacent to each other.

A pair of film electrodes (not illustrated) is connected to the heat-generating film 3 to supply a current flowing through the heat-generating film 3. Since the pair of film electrodes is arranged such that the current flows through the entire heat-generating film 3, it is possible to efficiently cause the heat-generating film 3 to generate heat. For example, if a region where the heat-generating film 3 is formed is rectangular, it is desirable to provide connection electrodes at a pair of opposing vertexes or in the vicinities thereof, respectively, or to provide connection electrodes at a pair of opposing sides or in the vicinities thereof, respectively.

The heat-generating coating material is a suspension obtained by using a solvent or water containing a binder as a dispersion medium and fine carbon particles as a dispersoid, and is applied to the surface of the ST board 130. As the binder, a polyurethane-based resin, a polyolefin-based resin, fluorine-based rubber, silicone rubber, or other synthetic resins can be used. The dispersion medium is a liquid obtained by dissolving or dispersing such a resin in a solvent or emulsifying such a resin in water. The fine carbon particles are powders containing carbon as a main component, and for example, a mixture of graphite and carbon nanotubes can be used. It is desirable that graphite have a particle size of 30 μm or less, and a carbon nanotube have an outer diameter of 1 μm or less and a length of 50 μm or less.

For example, the mixture of graphite and carbon nanotubes is dispersed in a solvent in which fluorine-based rubber is dissolved to obtain the heat-generating coating material. After such a heat-generating coating agent is applied to a predetermined region of the ST board 130, the solvent or water is evaporated and removed to form the heat-generating film 3.

The heat-generating coating material can be applied to the surface of the ST board 130 by spray coating, brush coating, a fluidized-bed coating method, or any other method. When the heat-generating coating material is applied, it is desirable to mask a region where the heat-generating film 3 is not to be formed. For example, the heat-generating film 3 can be formed in any region by forming a photoresist in advance in the region where the heat-generating film 3 is not to be formed and removing the photoresist after formation of the heat-generating film 3. In addition, when being formed on a conductive member, the heat-generating film 3 is formed with an insulating film interposed therebetween.

The heat-generating film 3 is formed by applying the heat-generating coating material, and thus, can be easily formed even in a region where it is difficult to form an electric heating wire constituting a conventional heater. For example, it is difficult to form a pattern of the electric heating wire on a surface having irregularities, a curved or bent surface, a narrow region, and the like, so that it is difficult to provide the conventional heater. However, the heat-generating film 3 can be formed even in such regions since the heat-generating film 3 is formed by coating.

For example, it is difficult to form the electric heating wire on the peripheral edge portion or the side surface of the ST board 130. The peripheral edge portion is supported by the board holder 16, and makes it difficult to form a circuit for reasons in terms of a manufacturing process. In addition, it is also difficult to form a circuit on the side surface of the ST board 130. However, the heat-generating film 3 can also be formed in such regions.

In addition, the heat-generating film 3 can be formed in both a wide region and a narrow region. When being formed in a wide region, the heat-generating film 3 can heat the inside of the region more uniformly as compared with a conventional heater (resistance wire). In addition, even if a through hole is provided in a part of a wide region, the through hole can be used as a heating element. Therefore, the possibility of failure caused by disconnection is lower as compared with the conventional heater in which the resistance wire meanders to cover a wide region, and reliability can be improved.

In addition, a central portion of the probe card 10 is easily warmed, but a peripheral edge portion thereof is hardly warmed in the horizontal plane. Therefore, it is possible to suppress the generation of the temperature gradient in the horizontal plane of the ST board 130 by forming the heat-generating film 3 on the peripheral edge portions of the upper and lower surfaces or the side surface of the ST board 130.

Although the description has been given by exemplifying a case where the heat-generating film 3 is formed on the ST board 130 in the present embodiment, the present invention is not limited to such a case. For example, the heat-generating film 3 can also be formed on the main board 100 that supports the probes 15 with the ST board 130 and the board holder 16 being interposed therebetween. In addition, the heat-generating film 3 can also be formed on the reinforcing plate 110.

Second Embodiment

In the present embodiment, an example of a specific configuration of the heat-generating film 3 will be described.

Figure 2:
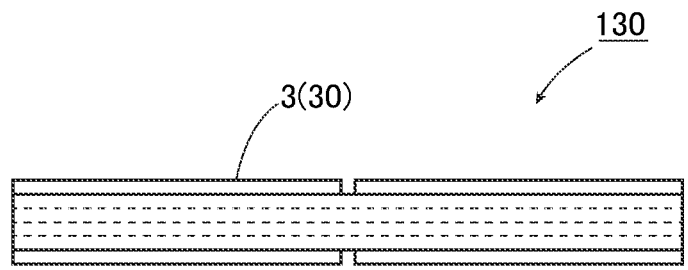
FIG. 2 illustrates a main portion of the probe card 10 according to a second embodiment of the present invention, and includes a front view and a bottom view of a ST board 130.
Figure 2:
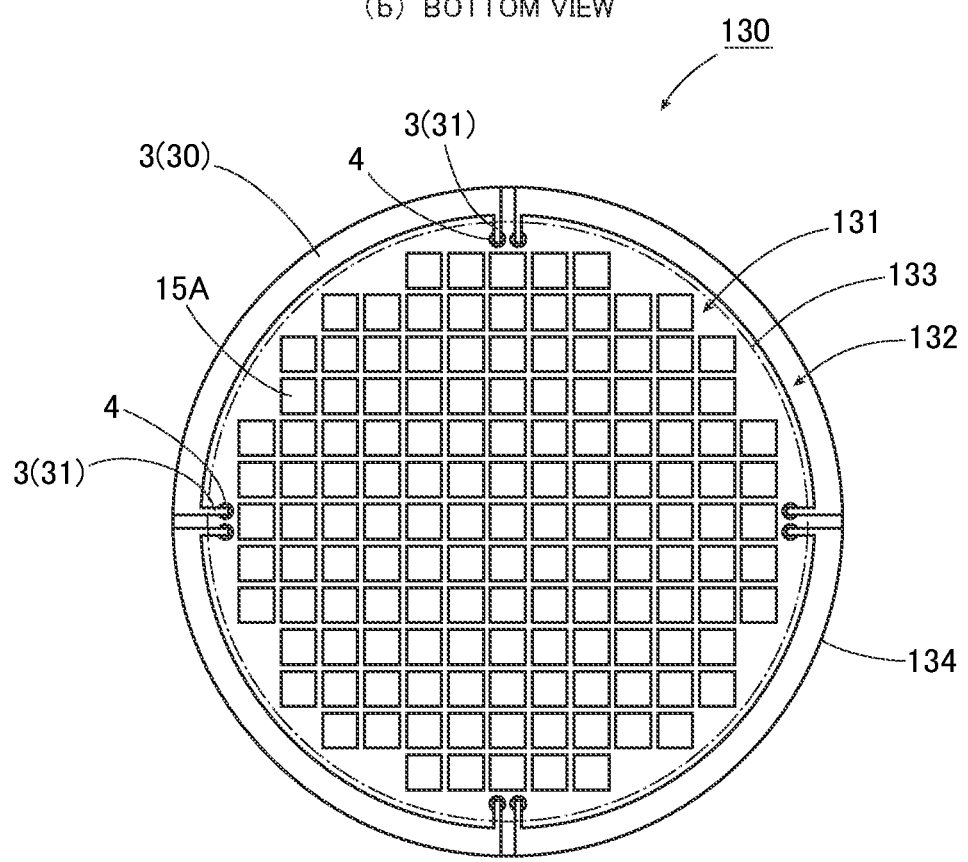
Figure 3:
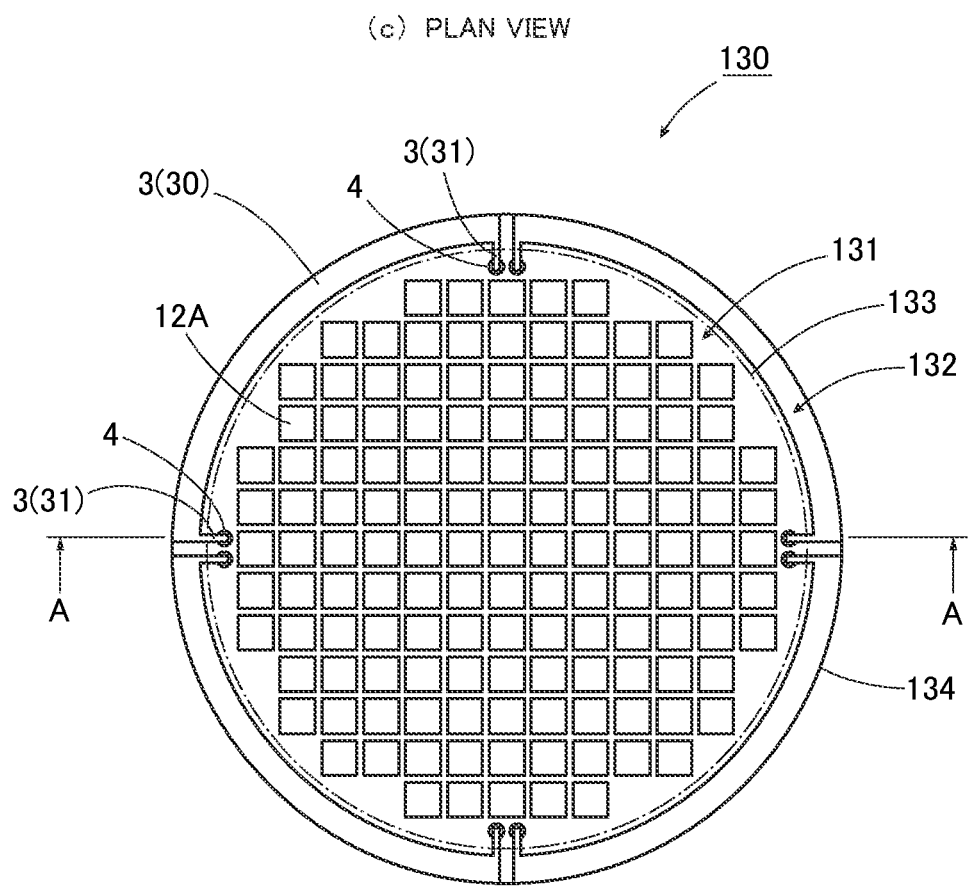
FIG. 3 illustrates a plan view and a A-A cross section of the ST board 130 shown in FIG. 2.
Figure 3:
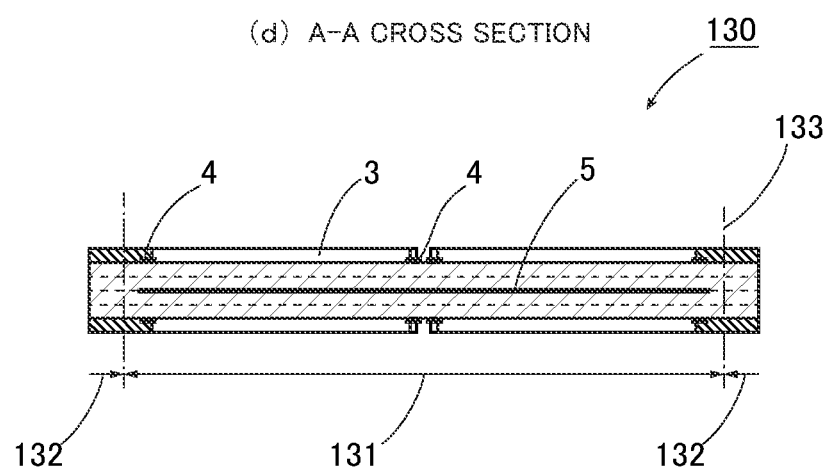

In FIGS. 2 and 3, (a) to (d) are views illustrating a main portion of the probe card 10 according to a second embodiment of the present invention, and illustrate an example of a detailed configuration of the ST board 130 of FIG. 1. In the drawings, (a) to (c) illustrate a front view, a bottom view, and a plan view of the ST board 130, respectively. In addition, (d) in the drawings illustrates a cross section (A-A section) as cut along a vertical plane passing through a cutting line A-A of (c).

The ST board 130 is divided into a circuit region 131 in which a circuit pattern is formed and a non-circuit region 132 in which no circuit pattern is formed in a horizontal plane. The circuit region 131 is a region including a central portion of the ST board 130, and is formed to be separated from an outer peripheral edge 134 of the ST board 130. The non-circuit region 132 is a region adjacent to the outer peripheral edge 134, and is an annular region formed on the outer side of the circuit region 131 so as to surround the circuit region 131. A boundary line 133 between the circuit region 131 and the non-circuit region 132 extends along the outer peripheral edge 134 of the ST board 130, the inner side of the boundary line 133 is the circuit region 131, and the outer side of the boundary line 133 is the non-circuit region 132.

All of the probe electrodes 13, the pogo pin electrodes 14, and a circuit pattern such as a through hole and a wiring pattern (not illustrated) are formed in the circuit region 131 and are not formed in the non-circuit region 132. A probe region 15A in the drawings is a region where one or more probe electrodes 13 are formed, and a large number of the probe regions 15A are formed in the circuit region 131 on a lower surface. In addition, a pogo pin region 12A in the drawings is a region where one or more pogo pin electrodes 14 are formed, and a large number of the pogo pin regions 12A are formed in the circuit region 131 on an upper surface.

Four heat-generating films 3 are formed in the non-circuit region 132. Each of the heat-generating films 3 is formed in each of regions obtained by dividing the non-circuit region 132 in a circumferential direction. That is, two or more heat-generating films 3 are arranged adjacent to each other in the circumferential direction, and each of the heat-generating films 3 has an elongated shape extending along the outer peripheral edge 134.

The heat-generating film 3 includes a main body film 30 configured for heat generation and a pair of lead films 31 configured for supplying a current. The main body film 30 has a large area that occupies most of the heat-generating film 3, and is formed in the non-circuit region 132. The pair of lead films 31 is connected to a pair of sides of the main body film 30 opposing each other in the circumferential direction or the vicinities thereof, respectively, extends to the circuit region 131 across the boundary line 133, and is connected to film electrodes 4.

The film electrodes 4 are electrode terminals configured to supply a current to the heat-generating film 3, and are formed in the circuit region 131. The film electrode 4 is electrically connected to the external terminal 11 on the main board 100 via the interposer 120.

The heater 5 is a known heating means, and includes an electric heating wire formed in the circuit region 131 of the lower surface, the upper surface, or an inner layer of the ST board 130. It is possible to suppress a temperature gradient from being generated in the horizontal plane of the ST board 130 by heating the circuit region 131 using the heater 5 and heating the non-circuit region 132 using the heat-generating film 3.

Although a case where the heat-generating film 3 is formed on each of the upper and lower surfaces of the ST board 130 has been described in the present embodiment, the present invention is not limited to such a case. For example, the heat-generating film 3 can be formed only on the lower surface or only on the upper surface.

In addition, a case where the ST board 130 includes the heater 5 has been described in the present embodiment, but the present invention is not limited to such a case, and the heater 5 can be omitted. The temperature of the ST board 130 is likely to be lower at a peripheral edge portion as compared with the central portion. Therefore, it is possible to suppress the generation of the temperature gradient in the horizontal plane of the ST board 130 by forming the heat-generating film 3 in the non-circuit region 132 adjacent to the outer peripheral edge 134.

In addition, a case where the four heat-generating films 3 are formed along the outer peripheral edge 134 has been described in the present embodiment, but the present invention is not limited to such a case. For example, one or more heat-generating films 3 can be formed along the outer peripheral edge 134. When only one heat-generating film 3 is formed along the outer peripheral edge 134, the heat-generating film 3 is formed in a C-shape in which a part in the circumferential direction is separated.

In addition, a case where the heat-generating film 3 is formed in the region adjacent to the outer peripheral edge 134 has been described in the present embodiment, but the present invention is not limited to such a case. For example, the heat-generating film 3 can also be formed in a region separated from the outer peripheral edge 134 in the non-circuit region 132.

Third Embodiment

In the second embodiment, the description has been given by exemplifying a case where the heat-generating film 3 is formed in the non-circuit region 132 of the ST board 130. On the other hand, in the present embodiment, a case where the heat-generating film 3 is formed not only in the non-circuit region 132 but also in the circuit region 131 will be described.

Figure 4:
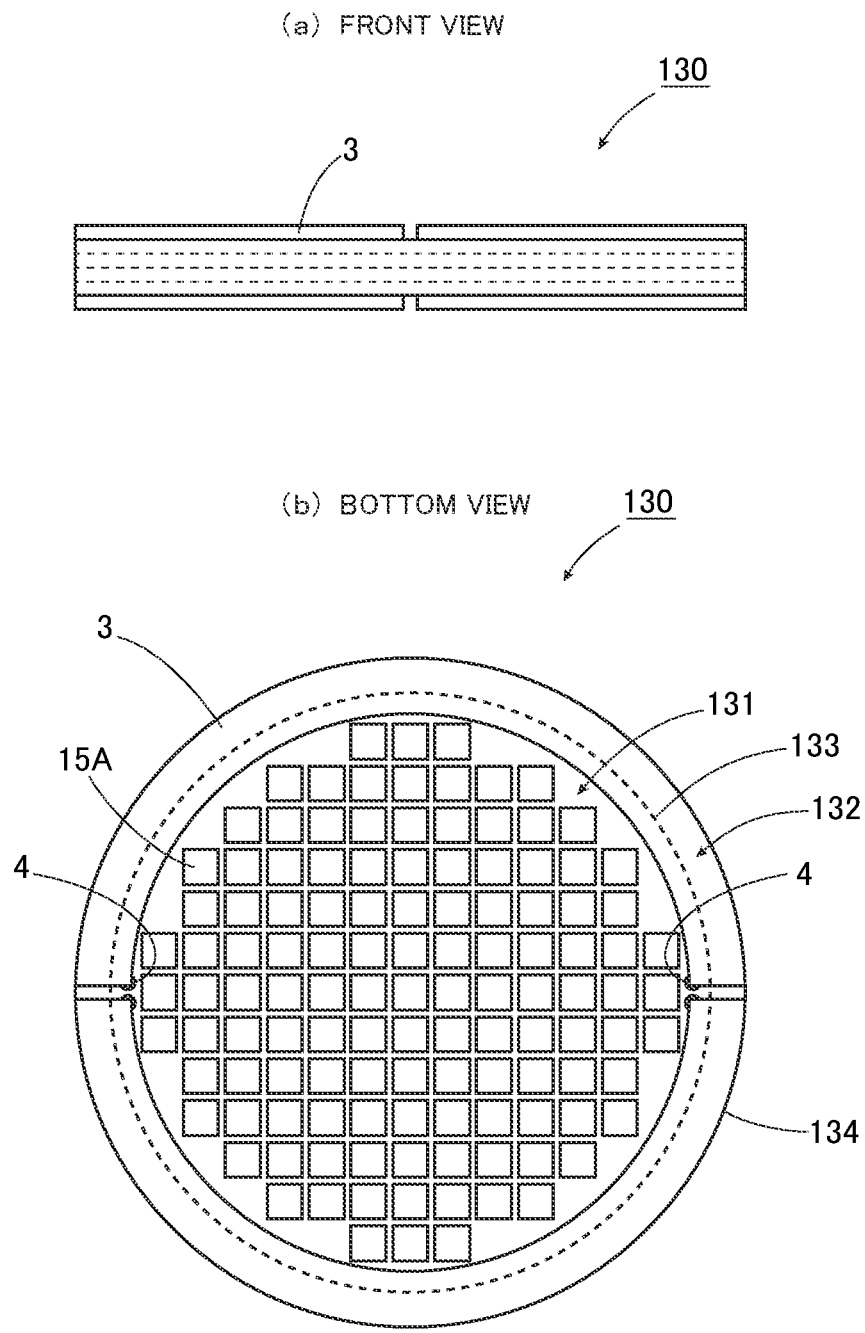
FIG. 4 illustrates a main portion of the probe card 10 according to a third embodiment of the present invention, and includes a front view and a bottom view of a ST board 130.
Figure 5:
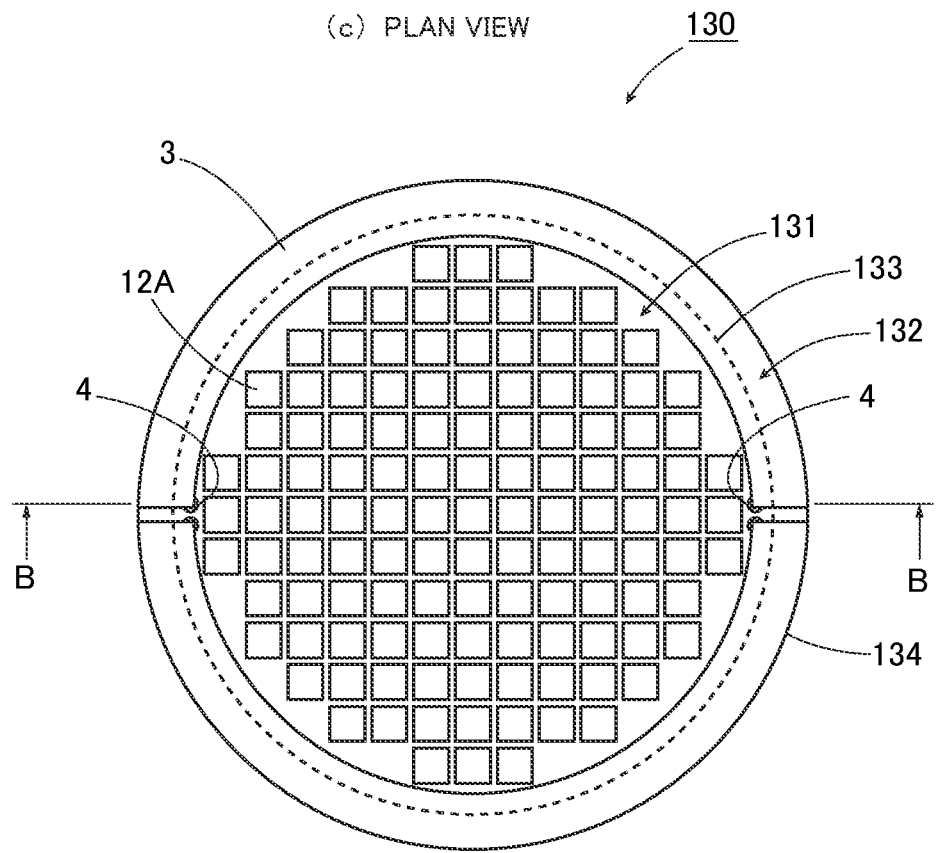
FIG. 5 illustrates a plan view and a B-B cross section of the ST board 130 shown in FIG. 4.
Figure 5:
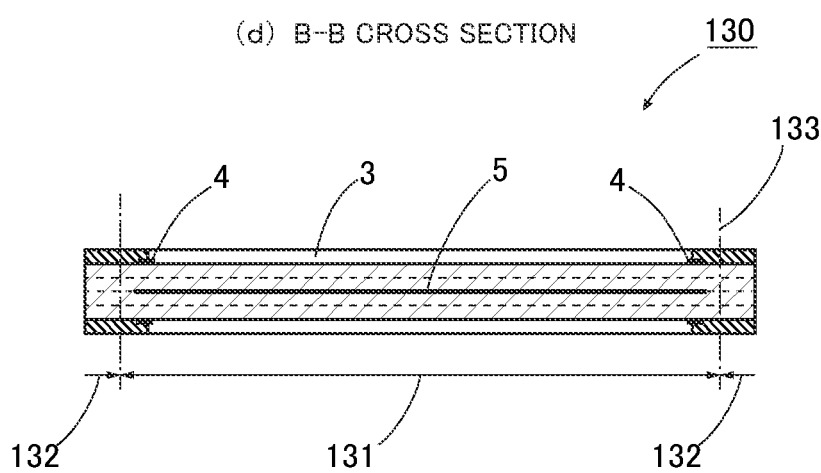

In FIGS. 4 and 5, (a) to (d) are views illustrating a main portion of the probe card 10 according to a third embodiment of the present invention, and illustrate an example of a detailed configuration of the ST board 130 of FIG. 1. In the drawings, (a) to (c) illustrate a front view, a bottom view, and a plan view of the ST board 130, respectively. In addition, (d) in the drawings illustrates a cross section (B-B section) as cut along a vertical plane passing through a cutting line B-B of (c). Note that components corresponding to the components illustrated in FIGS. 2 and 3 are denoted by the same reference numerals, and the redundant description thereof is omitted.

A difference from the ST board 130 (the second embodiment) in FIGS. 2 and 3 is that the main body film 30 is formed across the boundary line 133, and is formed not only in the non-circuit region 132 but also in the circuit region 131. Accordingly, it is also different in that the lead film 31 is not provided. In addition, it is also different in that two heat-generating films 3 are formed along the outer peripheral edge 134.

Since the heat-generating film 3 extending along the circumferential direction is formed not only in the non-circuit region 132 of the ST board 130 but also in the circuit region 131, it is possible to efficiently use a region on the main surface of the ST board 130. Therefore, the heat-generating film 3 can be formed in a wider region to effectively perform heating.

Fourth Embodiment

In the second and third embodiments, the description has been given by exemplifying a case where the heat-generating film 3 is formed on the lower surface or the upper surface of the ST board 130. On the other hand, in the present embodiment, a case where the heat-generating film 3 is formed on the side surface of the ST board 130 will be described.

Figure 6:
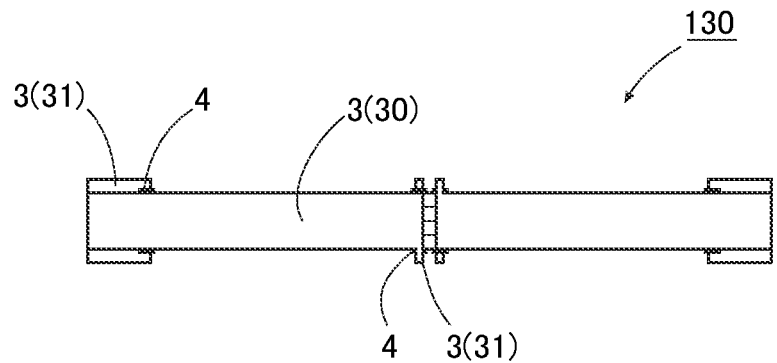
FIG. 6 illustrates a main portion of the probe card 10 according to a fourth embodiment of the present invention, and includes a front view and a bottom view of a ST board 130.
Figure 6:
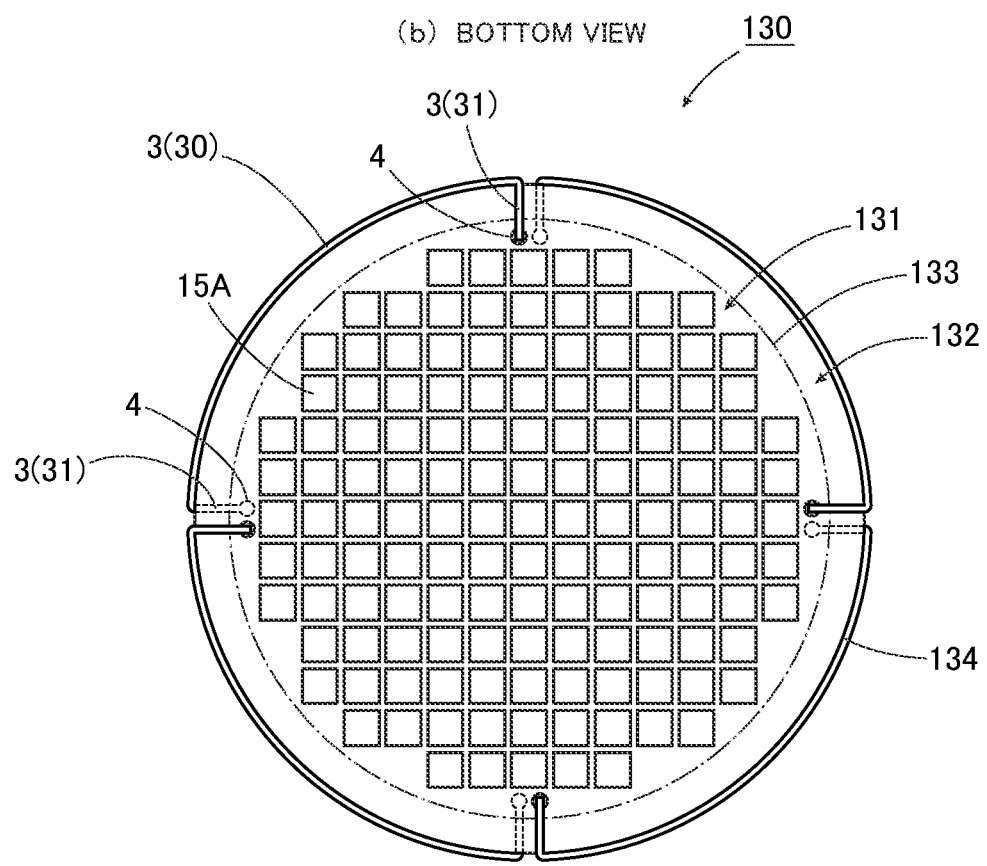
Figure 7:
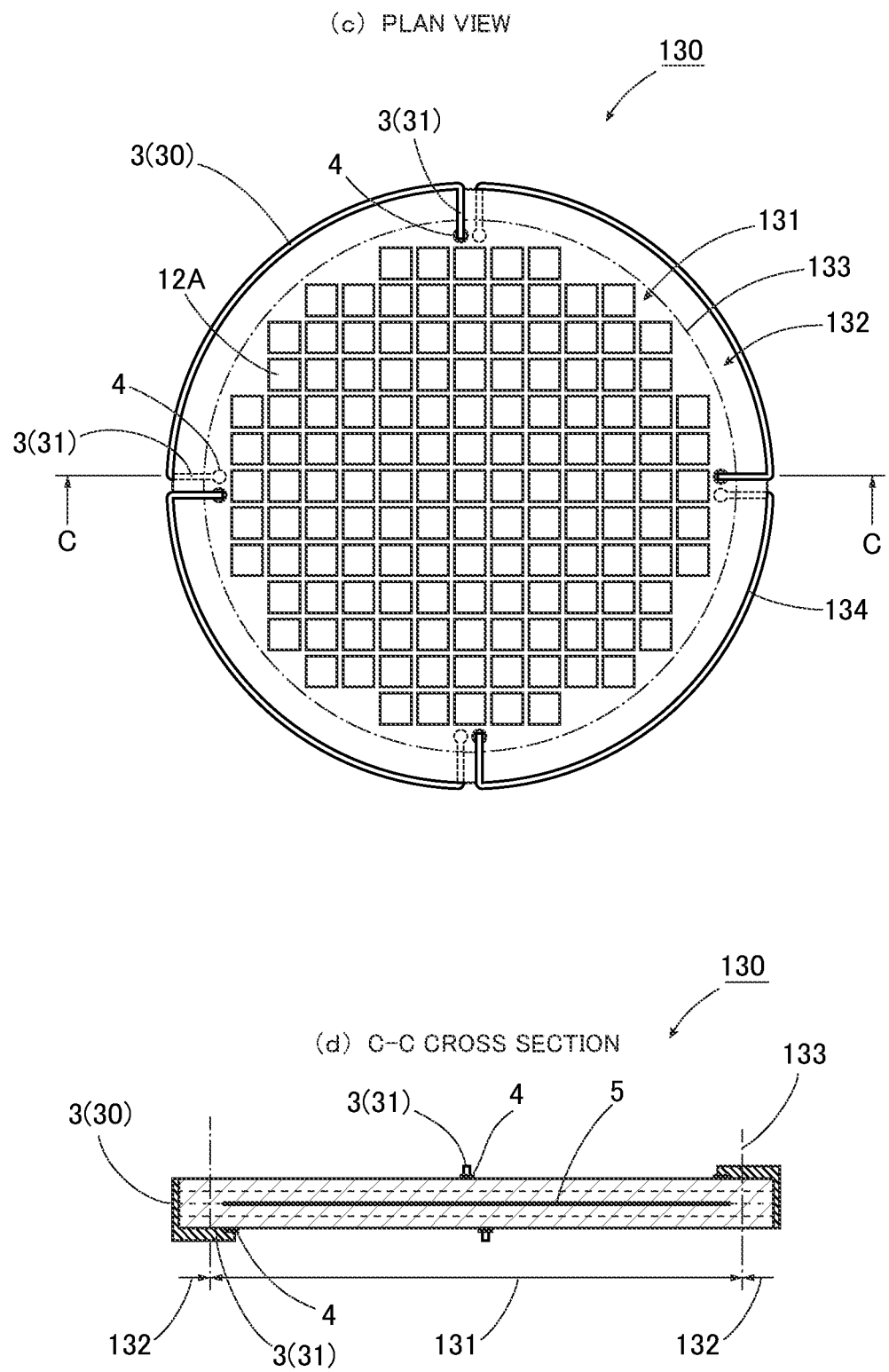
FIG. 7 illustrates a plan view and a C-C cross section of the ST board 130 shown in FIG. 6.

In FIGS. 6 and 7, (a) to (d) are views illustrating a main portion of the probe card 10 according to a fourth embodiment of the present invention, and illustrate an example of a detailed configuration of the ST board 130 of FIG. 1. In the drawings, (a) to (c) illustrate a front view, a bottom view, and a plan view of the ST board 130, respectively. In addition, (d) in the drawings illustrates a cross section (C-C section) as cut along a vertical plane passing through a cutting line C-C of (c). Note that components corresponding to the components illustrated in FIGS. 2 to 5 are denoted by the same reference numerals, and the redundant description thereof is omitted.

The heat-generating film 3 includes a main body film 30 configured for heat generation and a pair of lead films 31 configured for supplying a current. The main body film 30 has a large area occupying most of the heat-generating film 3, and is formed on the side surface of the ST board 130. The pair of lead films 31 is formed on the main surface of the ST board 130, and first ends being connected to a pair of sides opposing each other in the circumferential direction of the main body film 30 or the vicinities thereof, respectively, and second ends extending to the circuit region 131 across the boundary line 133 and being connected to the film electrodes 4.

In addition, one of the pair of film electrodes 4 is formed on the lower surface, and the other is formed on the upper surface. Therefore, one of the pair of lead films 31 is formed on the lower surface, and the other is formed on the upper surface. Since such a configuration is adopted, it is possible to connect the pair of lead films 31 to a pair of vertexes opposing each other in the diagonal direction of the main body film 30 having a substantially rectangular shape or the vicinities thereof, respectively, and it is possible to effectively generate heat by utilizing substantially the entire main body film 30.

Fifth Embodiment

In the fourth embodiment, the description has been given by exemplifying a case where the heat-generating film 3 is formed on the side surface of the ST board 130. On the other hand, in the present embodiment, a case where the heat-generating film 3 is formed on the non-circuit region 132 on the main surface of the ST board 130 in addition to the side surface of the ST board 130 will be described.

Figure 8:
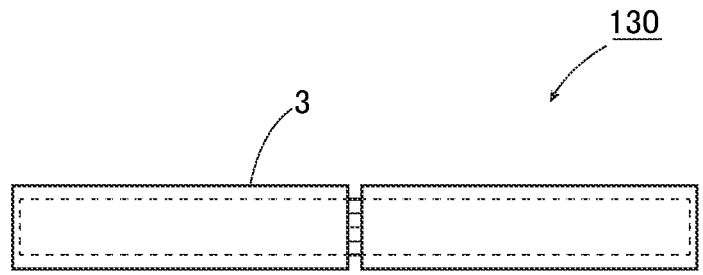
FIG. 8 illustrates a main portion of the probe card 10 according to a fifth embodiment of the present invention, and includes a front view and a bottom view of a ST board 130.
Figure 8:
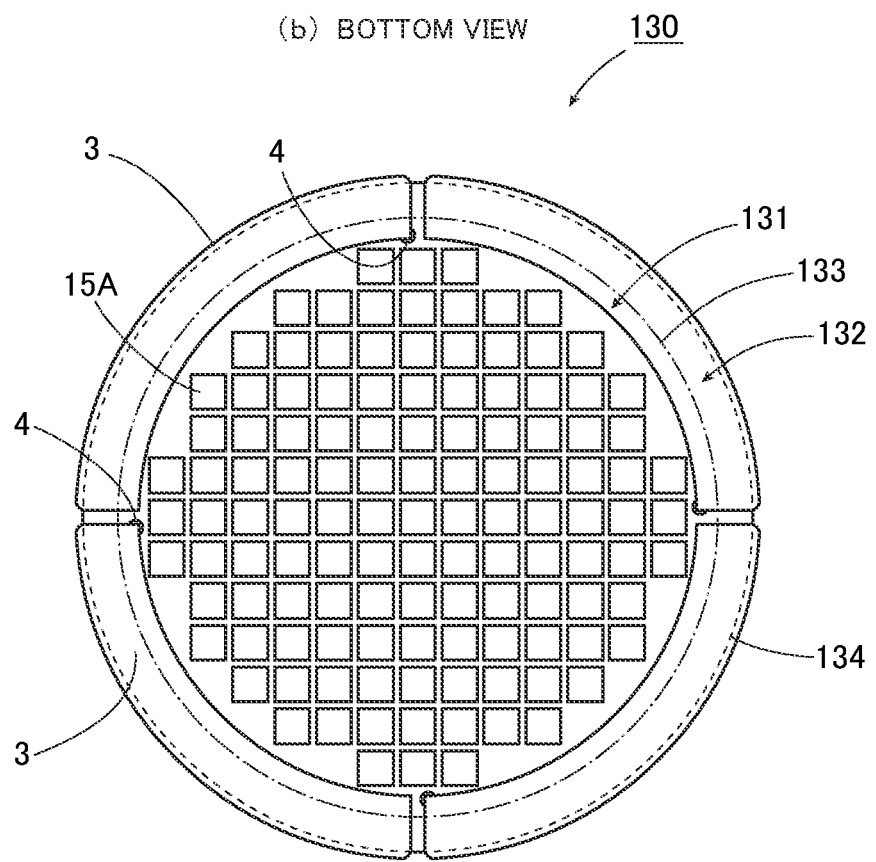
Figure 9:
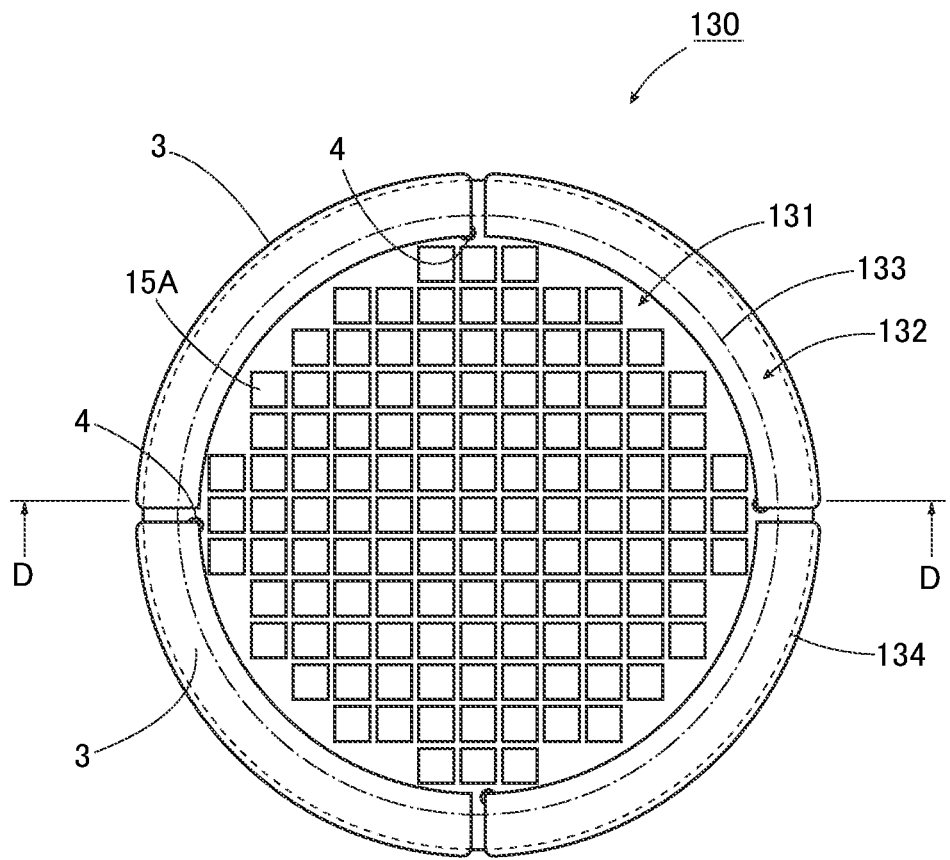
FIG. 9 illustrates a plan view and a D-D cross section of the ST board 130 shown in FIG. 8.
Figure 9:
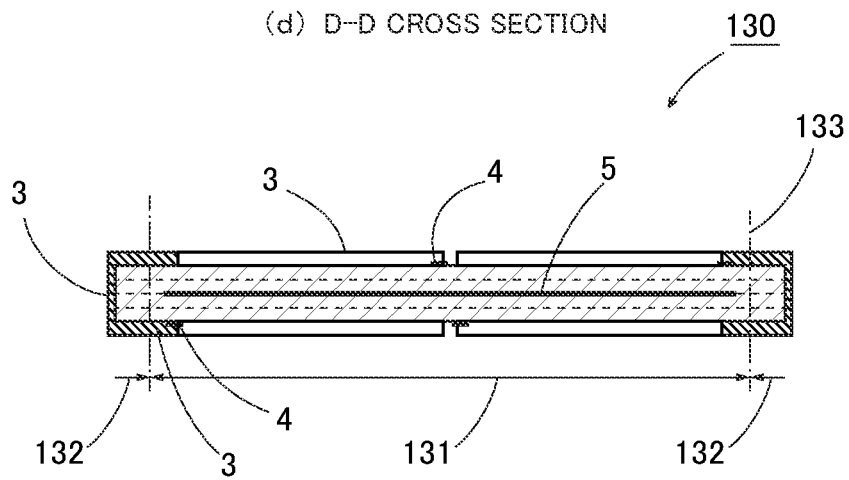

In FIGS. 8 and 9, (a) to (d) are views illustrating a main portion of the probe card 10 according to a fifth embodiment of the present invention, and illustrate an example of a detailed configuration of the ST board 130 of FIG. 1. In the drawings, (a) to (c) illustrate a front view, a bottom view, and a plan view of the ST board 130, respectively. In addition, (d) in the drawings illustrates a cross section (D-D section) as cut along a vertical plane passing through a cutting line D-D of (c). Note that components corresponding to the components illustrated in FIGS. 2 to 7 are denoted by the same reference numerals, and the redundant description thereof is omitted.

A difference from the ST board 130 (the fourth embodiment) in FIGS. 6 and 7 is that the heat-generating film 3 is formed across the outer peripheral edge 134 of the lower surface and the outer peripheral edge 134 of the upper surface, and formed so as to extend along the circumferential direction not only on the side surface of the ST board 130 but also on the lower surface and the upper surface. Further, the heat-generating film 3 formed on each of the upper surface and the lower surface is formed across the boundary line 133, and formed so as to extend in the circumferential direction not only in the non-circuit region 132 but also in the circuit region 131. Therefore, the heat-generating film 3 is also different in terms of being connected to the film electrode 4 without including the lead film 31.

Since the heat-generating film 3 is formed not only on the side surface of the ST board 130 but also in the non-circuit region 132 on the main surface to heat both the side surface and the non-circuit region 132, it is possible to effectively utilize the empty space on the ST board 130 for heating. In addition, since the circuit region 131 is also heated by forming the heat-generating film 3 not only in the non-circuit region 132 but also in the circuit region 131, the empty space on the ST board 130 can be more effectively utilized for heating. Therefore, the heat-generating film 3 can be formed in a wider region to effectively heat the ST board 130.

The pair of film electrodes 4 is arranged at vertexes opposing each other in the diagonal direction of the heat-generating film 3 or in the vicinities thereof. That is, one film electrode 4 is formed in the circuit region 131 on the lower surface of the ST board 130, and the other film electrode 4 is formed in the circuit region 131 on the upper surface of the ST board 130. In addition, these film electrodes 4 are connected to the vicinities of a pair of sides opposing each other in the circumferential direction of the heat-generating film 3. Therefore, it is possible to effectively generate heat by utilizing substantially the entire heat-generating film 3.

DESCRIPTION OF REFERENCE NUMERALS 3 heat-generating film
4 film electrode (electrode terminal)
5 heater
10 probe card
11 external terminal
12 pogo pin
12A ogo pin region
13 probe electrode
14 pogo pin electrode
15 probe
15A probe region
16 board holder
20 semiconductor wafer
21 electrode pad
30 main body film
31 lead film
100 main board 110 reinforcing plate
120 interposer
130 ST board
131 circuit region
132 non-circuit region
133 boundary line
134 outer peripheral edge
200 stage
201 heater
210 card holder

The invention claimed is:

1. A probe card comprising:
a wiring board that supports a large number of probes;
a heat-generating film formed on the wiring board; and
a pair of electrode terminals that supplies a current to the heat-generating film,
wherein the heat-generating film is formed on a surface of the wiring board by applying a heat-generating coating material containing fine carbon particles and a binder, and the heat-generating film is exposed on the wiring board.

2. The probe card according to claim 1, wherein at least a part of the heat-generating film is formed on a side surface of the wiring board.

3. The probe card according to claim 2, wherein one of the pair of electrode terminals is formed on one main surface of the wiring board, and another of the pair of electrode terminals is formed on another main surface of the wiring board.

4. The probe card according to claim 2, wherein the pair of electrode terminals is formed near a pair of end sides of the heat-generating film opposing each other in a circumferential direction.

5. The probe card according to claim 1, wherein the heat-generating film is formed in a region on a main surface adjacent to an outer peripheral edge of the wiring board.

6. The probe card according to claim 5, further comprising a heater circuit in a region separated from the outer peripheral edge of the wiring board.

7. The probe card according to claim 1, wherein
the wiring board is divided into a circuit region in which a circuit pattern is formed and a non-circuit region surrounding the circuit region in a plane parallel to a main surface, and
at least a part of the heat-generating film is formed in the non-circuit region.

8. The probe card according to claim 7, further comprising a heater circuit in the circuit region of the wiring board.

9. The probe card according to claim 7, wherein the pair of electrode terminals is formed in the circuit region.

* * * * *